United States Patent [19]

Jones

[11] 4,154,376

[45] May 15, 1979

[54] APPARATUS FOR DISCHARGING PREDETERMINED QUANTITIES OF MATERIAL

[76] Inventor: Robert S. Jones, Trehelig, Welshpool, Powys, Montgomeryshire, England

[21] Appl. No.: 798,871

[22] Filed: May 20, 1977

[30] Foreign Application Priority Data

May 21, 1976 [GB] United Kingdom ............... 21253/76
Nov. 8, 1976 [GB] United Kingdom ............... 46474/76

[51] Int. Cl.² .............................................. A01K 5/00
[52] U.S. Cl. .................................... 222/330; 119/52 B
[58] Field of Search ............... 222/415, 330, 199, 429, 222/485; 119/51 CF, 52 B, 52 AF

[56] References Cited

U.S. PATENT DOCUMENTS

| 2,515,455 | 7/1950 | Lipton | 119/51 CF |
| 2,717,725 | 9/1955 | Bennett | 222/485 |
| 3,478,723 | 11/1969 | Berg | 119/52 B |

FOREIGN PATENT DOCUMENTS 623817 10/1962 Belgium ............................ 119/52 AF Primary Examiner—Stanley H. Tollberg
Attorney, Agent, or Firm—Fleit & Jacobson

[57] ABSTRACT

Apparatus for discharging predetermined quantities of food for dairy cows and beef cattle, which apparatus comprises a hopper, an elongate flat-sided housing, a conveyor positioned in a conveyor section of the housing, a plurality of separate collector compartments formed in a collector section of the housing, and a plurality of sliding plates joined to a common rod for simultaneously closing and opening a plurality of discharge apertures in the collector compartments.

7 Claims, 7 Drawing Figures

APPARATUS FOR DISCHARGING PREDETERMINED QUANTITIES OF MATERIAL

This invention relates to apparatus for discharging predetermined quantities of material.

More specifically, this invention provides apparatus for discharging predetermined quantities of material, which apparatus comprises a hopper, an elongate housing, conveyor means positioned in a conveyor section of the housing, a plurality of separate collector compartments formed in a collector section of the housing, and a plurality of sliding obturators for closing and opening a plurality of discharge apertures in the collector compartments, the apparatus being such that the housing has flat side walls extending substantially the entire height of the housing and has the conveyor section positioned above the collector section with the conveyor section and the collector section sharing a common interior wall which constitutes the floor of the conveyor section and the roof of the collector section, the common interior wall having a plurality of filler apertures positioned above the collector compartments in the collector section whereby in use of the apparatus material from the hopper passes to the conveyor section and is conveyed along the conveyor section by the conveyor means from where it falls through the filler apertures into the collector compartments, the sliding obturators being such that when they are in registry with the discharge apertures in the collector compartments they allow the collector compartments to be progressively filled from the hopper end of the apparatus, and the sliding obturators being connected together so that they slide backwards and forwards together to simultaneously open and close the collector compartments.

The apparatus of the invention can be employed to dispense various types of material. Preferably, the material is in granular or particulate form.

When the apparatus of the invention is used for feeding livestock, then the material dispensed will be food and this may be in the above mentioned granular or particulate form. The precise food dispsensed will obviously depend upon the type of animals to be fed. Examples of animals that may be fed are dairy cows, beef cattle and sheep. Usually the food will be discharged into a feeding barrier or trough but, if desired, the food can be discharged into another type of container or even directly onto the ground.

When the apparatus of the invention is to be used in industry, it may be used in factories where it is desired to discharge predetermined quantities of chemicals, for example in granular or powder form, into bags or other containers. Similarly, food such as rice or grain could be discharged into the bags or other containers.

Usually, the hopper will be positioned at one end of the conveyor means although it can be positioned inwardly from the end of the conveyor means if desired. The conveyor means may be a chain and flight device or an auger. Other types of conveyor means may be used if desired.

The apparatus of the invention may include automatic stopping means for automatically stopping the conveyor means when the collector compartments are full. A suitable automatic stopping means may include a pressure sensing device which senses an increase in pressure when the collector compartments are full. The sensed pressure increase may be in the conveyor means or in the material being conveyed.

Embodiments of the invention will now be described solely by way of example and with reference to the accompanying drawings in which.

Figure 1:
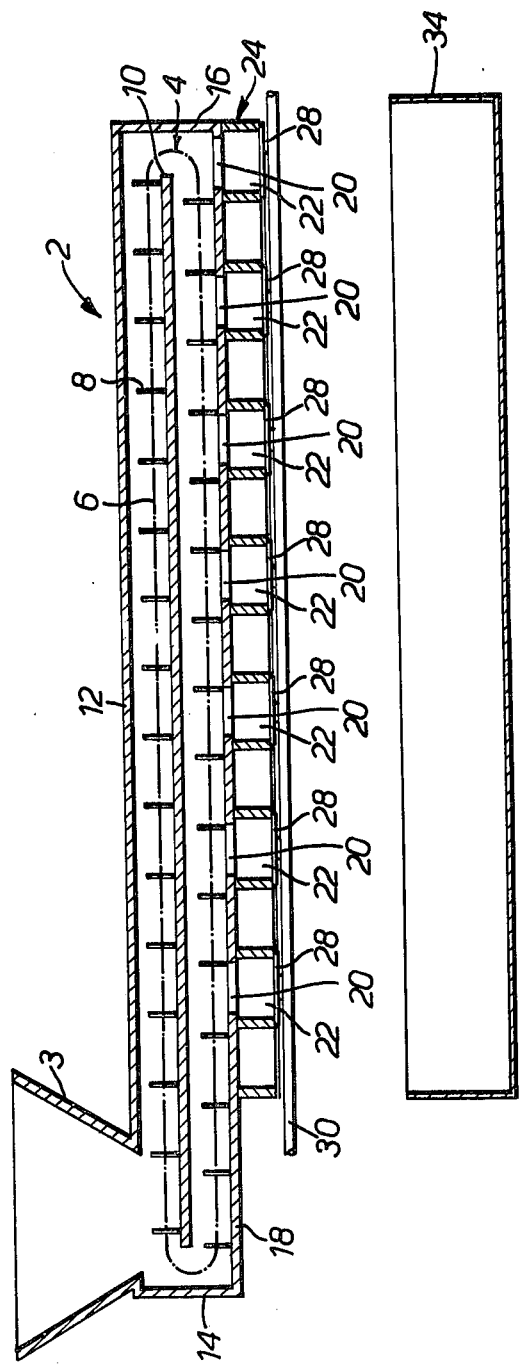
FIG. 1 is a schematic side view of first apparatus in accordance with the invention for discharging predetermined quantities of animal food in predetermined locations.
Figure 2:
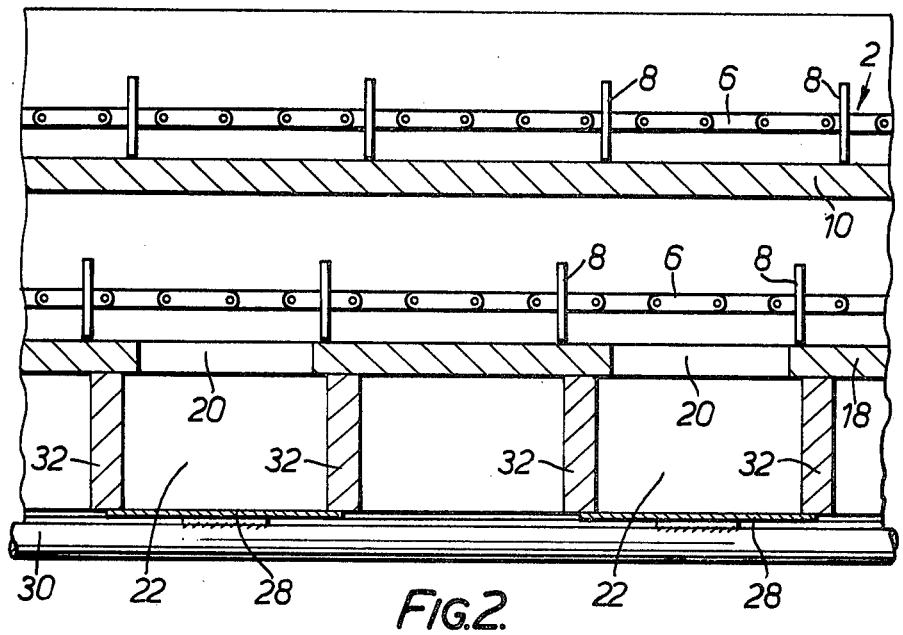
FIG. 2 shows in detail part of the apparatus shown in FIG. 1.
Figure 3:
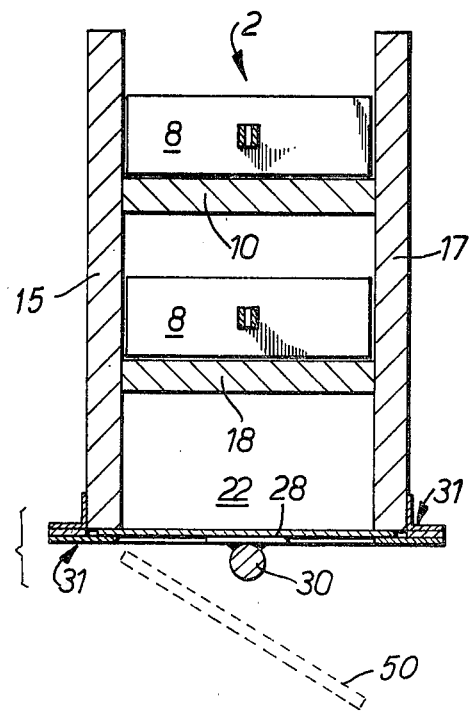
FIG. 3 shows a cross section of the apparatus shown in FIG. 1.

Referring to FIGS. 1-3, there is shown apparatus 2 for group feeding dairy cows and beef cattle. The apparatus 2 comprises a hopper 3 for containing food, and conveyor means 4 in the form of a chain and flight device. The conveyor means 4 comprises an endless chain 6 having flights 8 positioned thereon. The chain 6 passes around a dividing member 10 which may be made of timber or other suitable material.

The chain and flights run in a conveyor section of a housing having a roof 12, ends 14, 16 and flat sides 15, 17. The conveyor section has a floor 18 which is provided with filler apertures 20. The apertures 20 are positioned directly above and adjacent collector compartments 22 in a collector section 24 of the housing. Each collector compartment 22 is closed by an obturator in the form of a shutter 28. The shutters 28 are all connected to a bar 30 and they are adapted to slide in angle iron arrangements 31 as shown in FIG. 3. Movement of the bar 30 can move the shutters 28 as desired to open and close the collector compartments 22. As shown in FIG. 1, the shutters 28 are in position blocking discharge apertures in the collector compartments 22 so that the collector compartments 22 can be progressively filled with food from the hopper end of the apparatus 2. As shown most clearly in FIG. 2, the collector compartments 22 are separated from each other by walls 32, the walls 32 extending the entire height of the collector compartments 22.

In use, the food from the hopper 3 is conveyed by the flights 8 and discharges through the first aperture 20 to fill the first compartment 22. When the compartment 22 is full, the food rises into the path of the flights 8 and is carried along to fall through the next aperture 20 and fill the next compartment 22. This process is repeated until all the compartments 22 are full. The conveying means is then stopped, either manually or automatically using, for example, a pressure sensing device (not shown). Thereafter, the bar 30 is moved to move the shutters 28 and thus open the compartments 22. The food in the compartments 22 is then discharged into a feed barrier 34, the food falling into the barrier 34 such that it is conveniently placed for the group feeding of the dairy cows or beef cattle. After the food has been dispensed into the barrier 34, the shutters 28 can be returned to the position in which they close the compartments 22. The compartments 22 can then be refilled ready for the next feed of, for example, different cows or the same cows at a predetermined later time.

In FIGS. 4–7, similar parts have been given the same reference numeral. Their precise construction and operation will not be given again in order to avoid unnecessary description.

Figure 4:
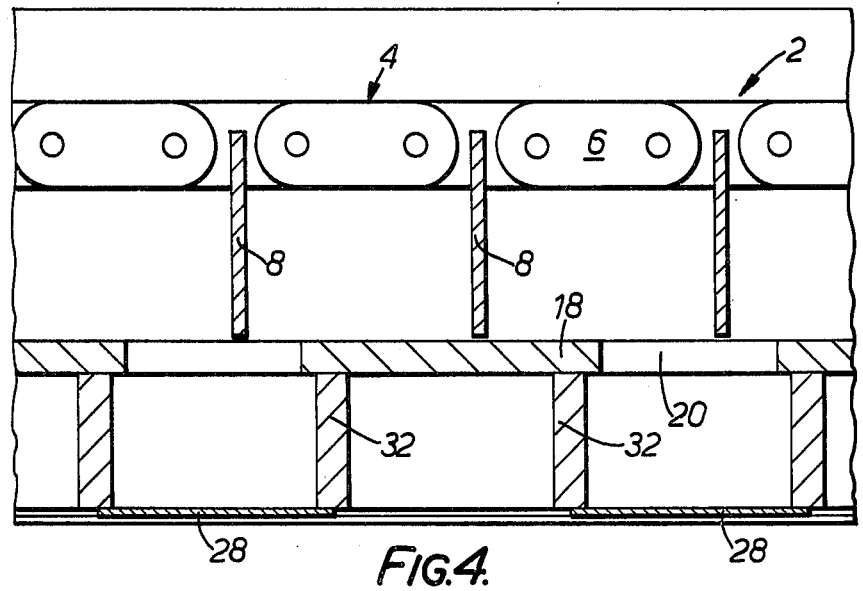
FIG. 4 shows a schematic side view of part of second apparatus in accordance with the invention for discharging predetermined quantities of animal food in predetermined locations.
Figure 5:
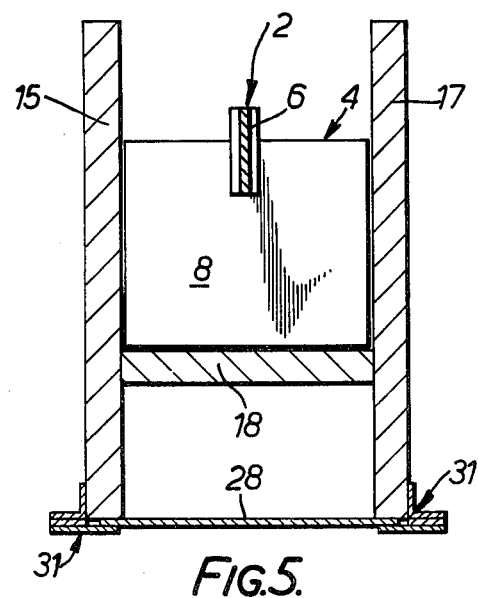
FIG. 5 is a cross section through the apparatus shown in FIG. 4.

Referring specifically to FIGS. 4 and 5, the apparatus 2 is very similar to that shown in FIGS. 1–3. In FIGS. 4 and 5, however, the chain and flight device 4 moves in a horizontal plane instead of in a vertical plane as in the apparatus 2 shown in FIGS. 1–3. This advantageously enables several feeding barriers to be provided around the path of the device 4 so that the food can be dispensed in spaced locations.

Figure 6:
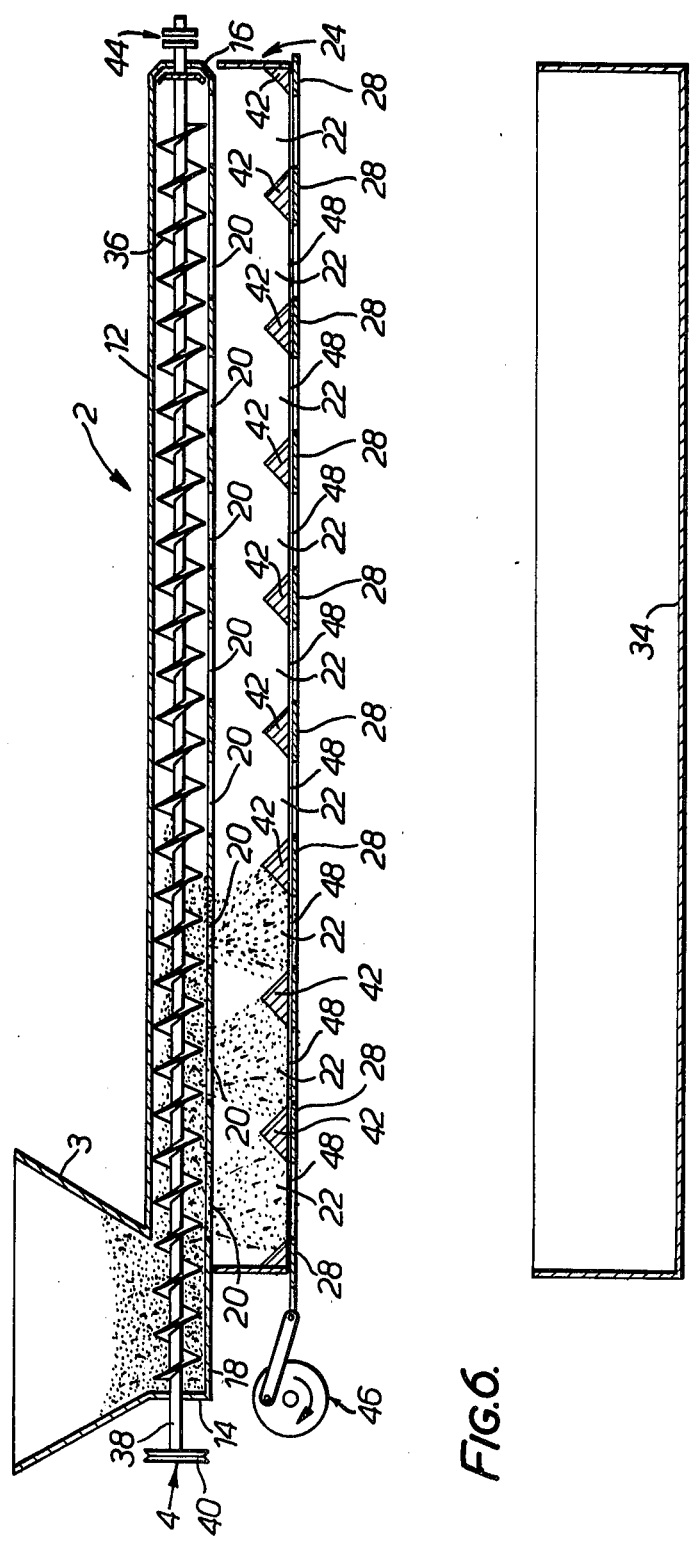
FIG. 6 is a schematic side view of third apparatus in accordance with the invention for discharging predetermined quantities of animal food in predetermined locations.
Figure 7:
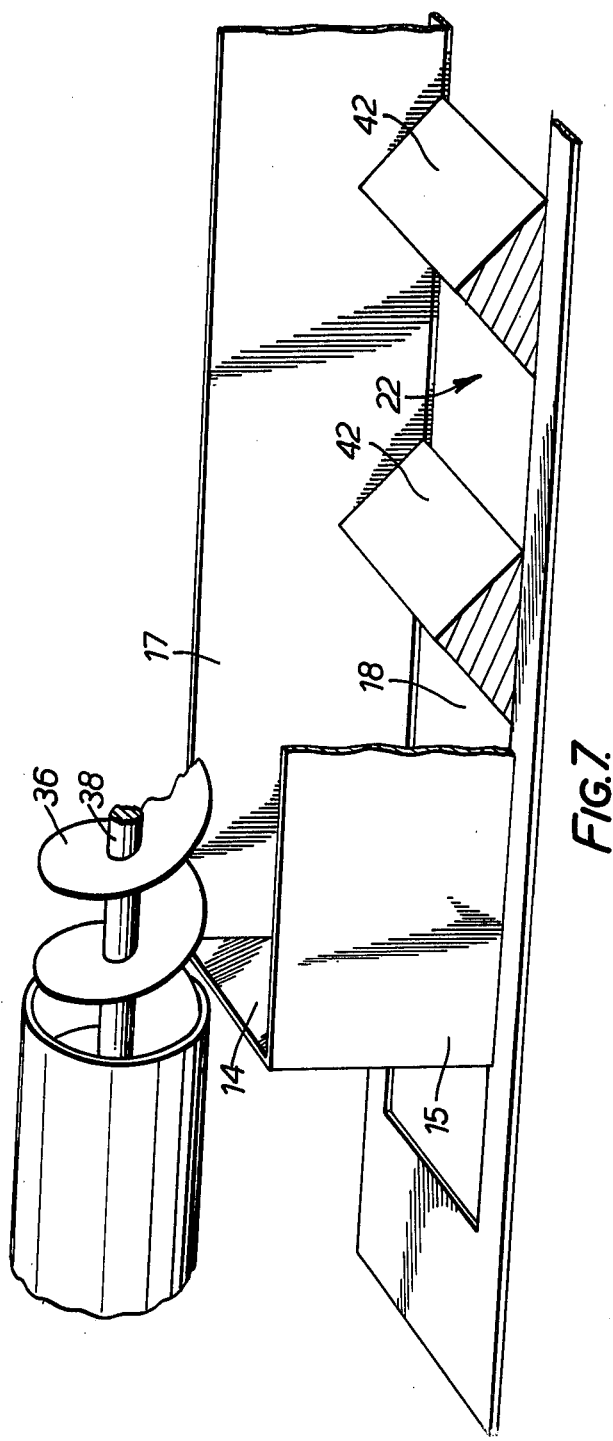
FIG. 7 shows details of part of the apparatus shown in FIG. 6.

Referring specifically to FIGS. 6 and 7, the apparatus 2 is modified to the extent that the conveyor means 4 is an auger comprising an auger blade 36 supported on a shaft 38. The shaft 38 is provided with a pulley or gear 40 which can be driven by a motor (not shown). Also, in FIGS. 6 and 7, the collector section 24 is spaced apart from the conveyor section, and the collector compartments 22 are separated by walls 42. The walls 42 are shaped as shown so that they are triangular in cross section and they do not extend the whole height of the compartments 22, i.e. they do not extend to the floor 18.

In FIGS. 6 and 7, the auger operates similarly to the chain and flight device shown in FIGS. 1–3 to convey food from the hopper 3 through the first aperture 20 to fill the first collector compartment 22. The food then back fills into the auger where it gets carried to the second aperture 20 to fill the second collector compartment 22, and so on until all the compartments 22 are filled. When all the compartments 22 are filled, a pressure switch 44 senses an increase in pressure on the auger and is effective to stop the auger. The quantity of material discharged into each compartment 22 can be varied by varying the distance of the conveyor means 4 from the compartments 22.

In FIG. 6, the shutters 28 are shown connected to a reciprocating rotary device 46 for collectively moving the shutters to allow the food in the compartments 22 to be discharged into the feeding barrier 34. Depending upon the distance of the feeding barrier 34 from the compartments 22 and also depending upon the size and number of the compartments 22, the food discharged from the compartments 22 can be in discrete piles in the feeding barrier 34 or it can be substantially evenly distributed in the feeding barrier 34.

The apparatus 2 may provide for the feeding of food concentrate in dairy cows away from the milking area without requiring labour previously needed for hand feeding. The operation of the auger and shutters can be controlled by timing devices to provide automatic feeding. The amount of food discharged can be varied by altering the height of the auger above the collector section 24.

In one practical embodiment of the invention, it was found that 60 cm of feeding barrier length is required for each animal and the auger is located about 2 meters above the barrier. The auger, of a known type, is 7.5 cm diameter internally with 6.25 cm diameter apertures 20 spaced 13.75 cm between adjacent edges. The collector section 24, e.g. a trough, has sides 15 cm high with 10 cm square apertures 48 in the bottom. The walls or partitions 42 are 5 cm high with sides sloping at 45°. The following are practical results:

| Height from base of collector means (trough) to base of auger (cm) | Cubed dairy nuts (lbs) | Rolled barley (lbs) |
| --- | --- | --- |
| 5 | 3 | 1.5 |
| 7.5 | 5 | 2.5 |
| 10 | 7 | 3.5 |
| 12.5 | 9 | 4.5 |
| 15 | 11 | 5.5 |

These quantities discharged from the trough were measured over a 60 cm length of feeding area and are thus amounts per animal.

It is to be appreciated that the embodiments of the invention described above have been given by way of example only and that modifications may be effected. Thus, for example, the chain and flight arrangement shown in FIGS. 4 and 5 could be replaced by an auger. Also, animals other than dairy cows and beef cattle can be fed, and materials other than food dispensed.

The apparatus of the invention can be fully automated by starting the conveyor means by a time clock and stopping the conveyor means by an automatic stopping means such for example as the pressure switch 44. The automatic stopping means can also be effective to start a motor which moves the obturator means to open the collector compartments to enable the material in the collector compartments to be discharged. The motor can be automatically stopped by a device such for example as a limit switch. The obturator means can be closed by the motor and the apparatus then automatically caused to commence another cycle of operations.

In a further modification of the invention, deflector means such for example as a deflector plate 50 as shown in FIG. 3 can be positioned beneath the collector section 24. The deflector means will usually run the whole length of the collector section 24. As the material is discharged from the collector compartments, it can be deflected to one side or the other depending upon the position of the deflector means. This advantageously enables the material to be dispensed on either side of the collector section 24 whereby, for example, a group of animals can be fed on either side of the apparatus of the invention and separately or simultaneously. Preferably, the deflector means tilts on either side to an angle of 45° and the movement of the deflector means can be effected manually or automatically.

I claim:

1. Apparatus for discharging predetermined quantities of material, which apparatus comprises a hopper, an elongated housing, conveyor means positioned in a conveyor section of the housing, a plurality of separate collector compartments formed in a collector section of the housing, a plurality of sliding obturators for closing and opening a plurality of discharge apertures in the collector compartments, a motor for driving the conveyor means, and pressure sensor means for sensing when all the collector compartments are full and for automatically causing the motor to stop driving the conveyor means, the apparatus being such that the housing has flat side walls extending substantially the entire height of the housing and has the conveyor section positioned above the collector section with the conveyor section and the collector section sharing a common interior wall which constitutes the floor of the conveyor section and the roof of the collector section, the common interior wall having a plurality of filler apertures positioned above the collector compartments in the collector section whereby in use of the apparatus material from the hopper passes to the conveyor section and is conveyed along the conveyor section by the conveyor means from where it falls through the filler apertures into the collector compartments, the sliding obturators being such that when they are in registry with the discharge apertures in the collector compartments they allow the collector compartments to be progessively filled from the hopper end of the apparatus, and the sliding obturators being connected together so that they slide backwards and forwards together to simultaneously open and close the collector compartments.

2. Apparatus according to claim 1 including movable deflector means for deflecting the material discharged from the collector compartments whereby a second discharge of material from the collector compartments can be discharged to a different place than a first discharge of material from the collector compartments.

3. Apparatus for discharging predetermined quantities of material, which apparatus comprises a hopper, an elongate housing, conveyor means positioned in a conveyor section of the housing, a plurality of separate collector compartments formed in a collector section of the housing, a plurality of sliding plate obturators for closing and opening a plurality of discharge apertures in the collector compartments, and an elongate rod connecting the sliding plate obturators, the apparatus being such that the housing has flat side walls extending substantially the entire height of the housing and has the conveyor section positioned above the collector section with the conveyor section and the collector section sharing a common interior wall which constitutes the floor of the conveyor section and the roof of the collector section, the common interior wall having a plurality of filler apertures positioned above the collector compartments in the collector section whereby in use of the apparatus material from the hopper passes to the conveyor section and is conveyed along the conveyor section by the conveyor means from where it falls through the filler apertures into the collector compartments, the sliding plate obturators being such that when they are in registry with the discharge apertures in the collector compartments they allow the collector compartments to be progressively filled from the hopper end of the apparatus, the sliding plate obturators being connected together so that they slide backwards and forwards together to simultaneously open and close the collector compartments, and the sliding plate obturators being caused to slide backwards and forwards by a reciprocating rotary device which has its axis of rotation at right angles to the backwards and forwards movement of the sliding plate obturators and which is connected to the rod by a link member, the link member being pivotally connected at one end of the end of the rod and at its other end to the reciprocating rotary device at a point remote from the axis of rotation of the reciprocating rotary device.

4. Apparatus according to claim 1 in which the conveyor means is a chain and flight device which moves in a horizontal plane whereby the conveyor means can feed two rows of spaced apart filler apertures.

5. Apparatus according to claim 3 in which the conveyor means is a chain and flight device which moves in a horizontal plane whereby the conveyor means can feed two rows of spaced apart filler apertures.

6. Apparatus according to claim 3 in which the collector compartments are defined by upstanding walls which are triangular in cross-section and which do not extend to the common wall.

7. Apparatus according to claim 3 in which the conveyor means is an auger.

* * * * *